United States Patent
Krisher

[11] Patent Number: 5,749,594
[45] Date of Patent: May 12, 1998

[54] METHOD AND STRUCTURE FOR CAMBER AND CASTER ADJUSTMENT FOR MOTOR VEHICLE WHEEL END ASSEMBLY

[75] Inventor: James A. Krisher, Fort Wayne, Ind.

[73] Assignee: Dana Corporation, Toledo, Ohio

[21] Appl. No.: 754,204

[22] Filed: Nov. 20, 1996

[51] Int. Cl.[6] .................................................. B62D 17/00
[52] U.S. Cl. ................................................................ 280/661
[58] Field of Search ............................................. 280/661

[56] References Cited

U.S. PATENT DOCUMENTS

| | | |
|---|---|---|
| 2,065,071 | 12/1936 | Harris . |
| 2,405,458 | 8/1946 | Slack et al. . |
| 2,674,465 | 4/1954 | Carpezzi . |
| 2,846,250 | 8/1958 | Davis . |
| 2,923,555 | 2/1960 | Kost et al. . |
| 3,273,909 | 9/1966 | Muller et al. . |
| 3,342,507 | 9/1967 | Koch et al. . |
| 4,243,339 | 1/1981 | Dickerson . |
| 4,252,338 | 2/1981 | Ingalls et al. . |
| 4,595,216 | 6/1986 | Ware . |
| 4,641,853 | 2/1987 | Specktor et al. . |
| 4,650,208 | 3/1987 | Mason . |
| 4,754,991 | 7/1988 | Jordan . |
| 4,831,744 | 5/1989 | Specktor et al. . |
| 4,836,574 | 6/1989 | Ingalls . |
| 4,867,473 | 9/1989 | Jordan . |
| 4,953,889 | 9/1990 | Reilly . |
| 4,953,894 | 9/1990 | Broszat . |
| 5,316,332 | 5/1994 | Ingalls . |
| 5,538,273 | 7/1996 | Osenbaugh et al. . |

*Primary Examiner*—Eric D. Culbreth
*Attorney, Agent, or Firm*—Oldham & Oldham Co., L.P.A.

[57] ABSTRACT

Method and structure for camber and caster adjustment in a motor vehicle wheel end assembly for a steerable axle where an upper arm extension member is attached to an upper arm portion of a tube yoke for the steerable axle by removable fasteners. Shims are added and/or removed between the upper arm extension member and the upper arm of the tube portion yoke to permit camber adjustment and oversized holes are provided in the upper arm portion of the tube yoke to permit caster adjustment. Such a design provides for adjustment of both camber and caster and eliminates the common problem of preloaded ball joints attributable, at least in part, to tube yoke and steering knuckle dimensional differences inherent in commonly utilized manufacturing processes.

20 Claims, 2 Drawing Sheets

METHOD AND STRUCTURE FOR CAMBER AND CASTER ADJUSTMENT FOR MOTOR VEHICLE WHEEL END ASSEMBLY

BACKGROUND AND SUMMARY OF THE INVENTION

The present invention relates generally to a new and novel method and structure which permits camber and caster adjustment in a motor vehicle wheel end assembly. More particularly, the present invention relates to a method and structure having an adjustable camber and caster arrangement for motor vehicle steerable axles where an upper arm extension member is attached to an upper arm portion of a tube yoke in the steerable axle by removable fasteners. Shims are added and/or removed between the upper arm extension member and the upper arm portion of the tube yoke to permit camber adjustment and oversized holes are provided in the upper arm portion of the tube yoke to permit caster adjustment.

Motor vehicles, such as four-wheel drive and front wheel drive trucks and automobiles, often employ a solid axle steerable structure arrangement in which a tube yoke is fixedly attached to the solid axle. Pivoting members, such as ball joints, are typically positioned between the tube yoke and the steering knuckle which in turn carries a spindle upon which a motor vehicle wheel is mounted for rotation therewith. When forces are introduced through, for example, a steering arm, the steering knuckle pivots relative to the tube yoke and the solid axle to provide steering to the attached motor vehicle wheels.

Camber and caster adjustments are important in providing proper motor vehicle handling characteristics and tire wear. This is particularly the case when wide, high floatation tires, such as those commonly used on four-wheel drive motor vehicles, are utilized. Misadjustment of camber and caster may cause only a limited portion of the bottom of the motor vehicle tire to contact the road or some other supporting surface. This can result in not only accelerated tire wear, but also unsafe motor vehicle handling characteristics on rigid roadways or some other supporting surfaces. Furthermore, driving the motor vehicle in such a condition on a roadway or some other supporting surface at higher speeds can lead to overheating of the small contact patch between the motor vehicle tires and the roadway or some other supporting surface. Thus, motor vehicle camber and caster misadjustment can result in higher motor vehicle operating costs, through excessive tire wear and fuel consumption, and compromised motor vehicle handling characteristics and safety.

However, many traditional beam-type front steerable axles are manufactured with fixed camber and caster. Due to dimensional variations inherent in manufacturing processes commonly utilized to fabricate such beam-type front steerable axles, the camber and caster angles usually vary from the left side of the beam-type front steerable axle to the right side of the beam-type front steerable axle. This variation in the camber and caster from the left side of the beam-type front steerable axle to the right side of the beam-type front steerable axle adversely impacts the steering effort necessary to control the motor vehicle, motor vehicle tracking characteristics and motor vehicle tire wear.

Various methods and structures have been used in an attempt to provide for motor vehicle wheel camber and caster adjustment. For example, in some instances, particularly in non-four-wheel drive motor vehicles, camber has been adjusted by bending the solid axle to position the tire in a more or less desired camber position. Such bending of the solid axle has not been widely utilized in conjunction with four-wheel drive motor vehicles which typically employ a tubular axle housing since space is generally not available to position a bending device on such a tubular axle and the hollow axle housing is subject to stress failure.

Other prior art camber and caster adjustment arrangements have utilized shims positioned between the spindle mounting member and the spindle to provide for adjustment of the angular position of the spindle relative to the solid axle. However, to utilize shims in such a manner, the hub, spindle and other wheel mounting members must be removed, involving a fair amount of manual labor and expense. Furthermore, since such shims do not change the steering geometry, no change in caster is possible.

Still other prior art camber and caster adjustment arrangements utilize bushings and wedge washers of various configurations which are installed in conjunction with ball joints such that the bushings or wedge washers displace the axial position and the orientation of the ball joints, as desired, to provide camber and caster adjustment. However, the use of such bushings and wedge washers to adjust camber and caster has generally involved a "trial and error" procedure which requires a significant amount of time and expense. Furthermore, although various methods for measuring the camber and caster to determine what bushing or wedge washer is appropriate for a particular steerable wheel axle, for determining the proper bushing or wedge washer to be utilized and for determining the proper orientation of such bushing or wedge washer in relation to the ball joints have been proposed, such methods are generally complex, expensive and/or time consuming.

Accordingly, such prior art methods and structures for adjusting camber and caster in motor vehicle wheel end assemblies have generally been imprecise, involve a significant amount of time and/or expense, and/or include a variety of components which add to the complexity, weight, cost, ease of assembly and disassembly, and the ease of adjustment of such prior art motor vehicle wheel end assemblies.

A preferred embodiment of the present invention is, therefor, directed to a method and structure for camber and caster adjustment in a motor vehicle wheel end assembly for a steerable axle where an upper arm extension member is attached to an upper arm portion of a tube yoke for the steerable axle by removable fasteners. Shims are added and/or removed between the upper arm extension member and the upper arm portion of the tube yoke to permit camber adjustment and oversized holes are provided in the upper arm portion of the tube yoke to permit caster adjustment. Such a design provides for adjustment of both camber and caster and eliminates the common problem of preloaded ball joints attributable, at least in part, to tube yoke and steering knuckle dimensional differences inherent in commonly utilized manufacturing processes.

Accordingly, the method and structure which permits camber and caster adjustment in a motor vehicle wheel end assembly in accordance with the present invention provide a simple, cost-effective arrangement for adjusting camber and caster in motor vehicle wheel end assemblies.

Other advantages and novel features of the present invention will become apparent in the following detailed description of the invention when considered in conjunction with the accompanying drawing.

DETAILED DESCRIPTION OF THE DRAWINGS

Figure 1:
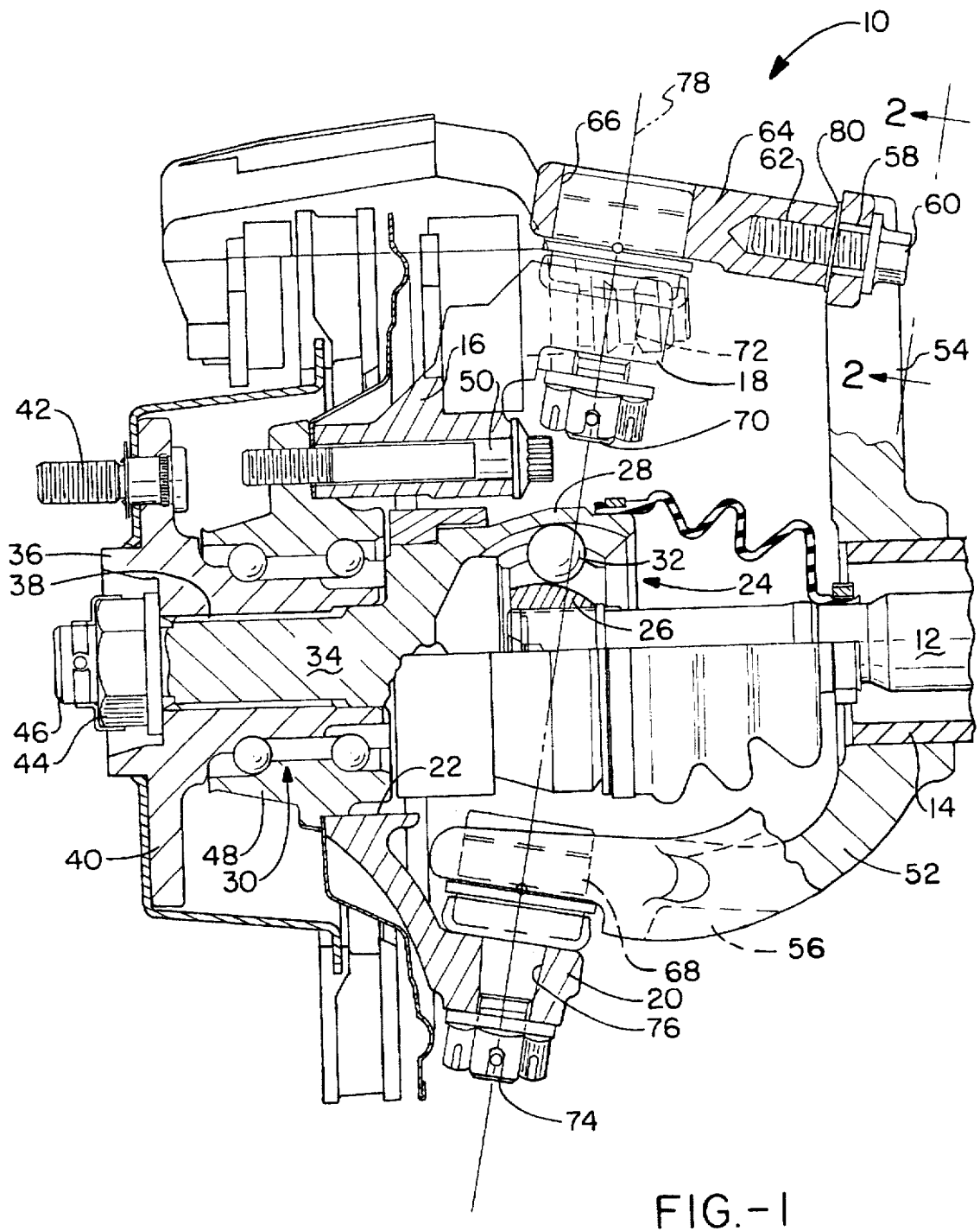
FIG. 1 illustrates a sectional side view, partly in cross-section and partly in plan view, of a motor vehicle wheel end assembly which permits camber and caster adjustment in accordance with a preferred embodiment of the present invention.
Figure 2:
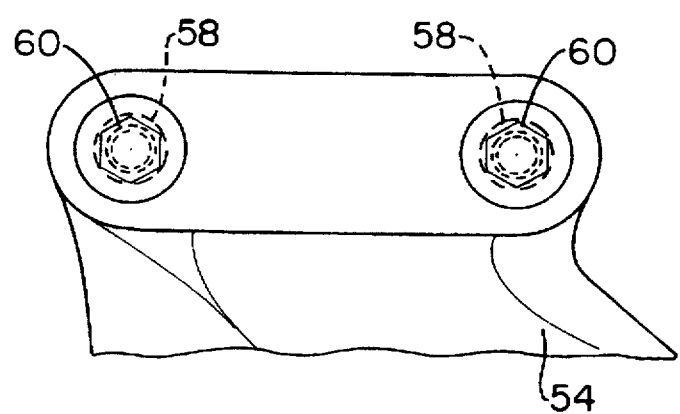
FIG. 2 illustrates a schematic sectional side view of the motor vehicle wheel end assembly which permits camber and caster adjustment in accordance with the preferred embodiment of the present invention shown in FIG. 1 taken across lines 2—2 in FIG. 1.

In the following detailed description of a preferred embodiment of the present invention, reference is made to the accompanying drawing which, in conjunction with this detailed description, illustrates and describes a preferred embodiment of a motor vehicle wheel end assembly which permits camber and caster adjustment in accordance with the present invention. Referring now to FIG. 1, which illustrates a sectional side view, partly in cross-section and partly in plan view, of a motor vehicle wheel end assembly, generally identified by reference numeral 10, in accordance with a preferred embodiment of the present invention, wheel end assembly 10 is designed for use on a driving and steering axle of a motor vehicle. Accordingly, wheel end assembly 10 would typically be utilized in conjunction with the front axle of a front-wheel drive motor vehicle or in conjunction with the front axle of a four-wheel drive motor vehicle, although its use is not necessarily limited to such environments. The driving and steering axle of a motor vehicle normally includes a differential (not shown) which is positioned between two (2) wheel end assemblies 10 and receives torque from a transaxle or four-wheel drive transfer case (not shown) and transfers the torque so received to either or both wheel end assemblies 10 through torque transferring axle shaft 12 which is disposed, at least in part, within axle tube 14.

Wheel end assembly 10 generally includes steering knuckle 16 having upper mounting boss 18 and lower mounting boss 20 which allows steering knuckle 14 to be attached to the motor vehicle chassis (not shown). Steering knuckle 16 also includes at least one bore 22 extending therethrough.

Wheel end assembly 10 also includes constant velocity (CV) joint, generally indicated by reference numeral 24. Constant velocity (CV) joint 24 preferably includes inner member or race 26 which is splined or otherwise drivingly coupled to torque transferring axle shaft 12 and outer member or race 28 which is supported for rotation within bore 22 of steering knuckle 16 by bearing assembly 30.

Circumferentially spaced torque transmitting balls 32, of which only one (1) is shown in FIG. 1, are positioned between inner member or race 26 and outer member or race 28. Each circumferentially spaced torque transmitting ball 32 is received within one of a plurality of grooves formed in inner member or race 26 and a cooperating and corresponding one of a plurality of grooves formed in outer member or race 28 so as to transmit torque from inner member or race 26 to outer member or race 28. Circumferentially spaced torque transmitting balls 32 and grooves cooperate such that torque is transmitted from inner member or race 26 to outer member or race 28 at a constant angular velocity throughout the range of steering motion of wheel end assembly 10. Circumferentially spaced torque transmitting balls 32 are typically retained within grooves in inner member or race 26 and outer member or race 28 by a cage member (not shown). It should be noted that other arrangements for providing a constant angular velocity coupling between inner member or race 26 and outer member or race 28 are known, and this invention is not intended to be limited to any particular arrangement for providing such a constant angular velocity coupling between inner member or race 26 and outer member or race 28.

In the illustrated embodiment of the invention shown in FIG. 1, outer member or race 28 of constant velocity (CV) joint 24 is integrally formed with wheel spindle 34. Alternatively, outer member or race 28 of constant velocity (CV) joint 24 could be fabricated separate from and attached, such as by fasteners, to wheel spindle 34. The relationship between outer member or race 28 of constant velocity (CV) joint 24 and wheel spindle 34 does not form a part of the present invention.

Wheel hub 36 preferably is splined 38 or otherwise rotationally connected to wheel spindle 34 and includes wheel mounting flange 40. Motor vehicle wheel (not shown) is mounted to wheel mounting flange 40 by wheel mounting studs 42, only one of which is shown in FIG. 1, which extend through wheel mounting flange 40. Wheel hub 36 is retained on wheel spindle 34 by nut 44 which engages externally threaded outboard end 46 of wheel spindle 34.

As discussed previously, outer member or race 28 is rotatably supported within bore 22 in steering knuckle 16 by bearing assembly 30. Stationary outer member or race 48 is fastened to steering knuckle 16 by conventional fasteners, such as bolts 50, only one (1) of which is shown in FIG. 1, thereby coupling steering knuckle 16 to wheel hub 36 and wheel spindle 34 to provide for steering of the motor vehicle wheel. Thus, during operation of the motor vehicle, torque is transferred from torque transferring axle shaft 12 through constant velocity (CV) joint 24 to wheel spindle 34 and wheel hub 36 into the motor vehicle's wheels and tires mounted on wheel mounting flange 40 of wheel hub 36.

Tube yoke 52 is attached to axle tube 14 and includes vertically spaced upper arm portion 54 and lower arm 56. Upper arm portion 54 includes one or more oversized opening 58 through which one or more fasteners, such as bolts 60, only one of which is shown in FIG. 1, are positioned to engage with internally threaded openings 62 in upper arm extension member 64. This is in contrast to most prior art tube yokes, which traditionally are a one-piece member, rather than the two-piece arrangement of the preferred embodiment of the invention described herein, which consists of two (2) members, tube yoke 52 and upper arm extension member 64. In a preferred embodiment of the present invention two (2) externally threaded fasteners, such as bolts 60, are used which engage with two (2) internally drilled and tapped threads in upper arm extension member 64, the second bolt 60 being positioned directly behind bolt 60 shown in FIG. 1, and both bolts 60 extending through corresponding oversized openings 58 in upper arm portion 54 of tube-yoke 52, the oversized openings preferably having their primary axis extending along an axis substantially perpendicular to tube yoke 52. Upper arm extension member 64 has generally cylindrical bore 66 formed therethrough and lower arm 56 has generally cylindrical bore 68 formed therethrough. Steering knuckle 16 includes upper mounting boss 18 which is positioned adjacent upper arm extension member 64 and lower mounting boss 20 which is positioned adjacent lower arm 56 of tube yoke 52. Thus, steering knuckle 16 is rotatably attached to tube yoke 52.

Conventional ball joint 70 is positioned in generally cylindrical bore 66 formed in upper arm extension member 64 and tapered bore 72 extending through upper mounting boss 18 of steering knuckle 16. Similarly, conventional ball joint 74 is positioned in generally cylindrical bore 68 formed in lower arm 56 of tube yoke 52 and tapered bore 76 extending through lower mounting boss 20 of steering knuckle 16. Conventional ball joints 70 and 74 each preferably include an internal spherical bearing (not shown) and function in a conventional manner so as to permit upper mounting boss 18 and lower mounting boss 20 of steering knuckle 16 to rotate relative to upper arm extension member 64 and lower arm 56 of tube yoke 52.

In use, motor vehicle wheel end assembly 10 defines the manner in which the motor vehicle tire (not shown) contacts the road or some other supporting surface. In operation, motor vehicles frequently encounter hazards, such as potholes and curbs, which deflect and deform various components in motor vehicle wheel end assembly 10. Such deformation of components in motor vehicle wheel end assembly 10 can alter the orientation of pivotal axis 78 from the manufacturer's original design specifications and can adversely impact motor vehicle operation and safety, including causing excessive motor vehicle tire wear, increasing the steering effort and difficulty of controlling the motor vehicle and motor vehicle tracking characteristics. This can result in increased motor vehicle operating expenses and safety can be compromised.

For example, laterally shifting the pivotal axis 78 by moving conventional ball joint 70 inwardly toward torque transferring axle shaft 12 can result in a shift of the point of load toward an inward edge of the motor vehicle tire (not shown) resulting in accelerated tire wear on the inward edge, and at the same time, reducing the amount of tire surface which contacts the road or some other supporting surface. Such an arrangement would generally result in increased and uneven tire wear and will also adversely impact motor vehicle handling characteristics.

On the other hand, laterally shifting pivotal axis 78 by shifting conventional ball joint 74 inwardly toward torque transferring axle shaft 12 can result in a shift of the point of load toward an outward edge of the motor vehicle tire (not shown) resulting in accelerated tire wear on the outward edge, and at the same time, reducing the amount of tire surface which contacts the road or some other supporting surface. Such an arrangement would generally result in increased and uneven tire wear and will also adversely impact motor vehicle handling characteristics.

Changes in alignment as described above is known as camber. Camber is generally the number of degrees that the center line of the wheel carrying the motor vehicle tire (not shown) is inclined from a true vertical plane perpendicular to the front axle and normal to the road or other supporting surface when viewed from the front of the motor vehicle. A positive camber occurs when the top of the motor vehicle wheel is further out than the bottom of the motor vehicle wheel. A slight amount of positive camber generally reduces the steering effort required to turn a motor vehicle and, in addition, reduces the loading and rate of wear of the outer wheel bearing (not shown).

Furthermore, pivotal axis 78 has a fore and aft inclination parameter which is known as caster. Caster is defined as the number of degrees that pivotal axis 78 is inclined from a true vertical plane which includes the front axle. A positive caster is when the top of pivotal axis 78 is more rearward on the motor vehicle than is the bottom of pivotal axis 78. A slight positive caster tends to increase the directional stability of the motor vehicle's steering and thus reduces susceptibility to cross wind or deviations in the road or some other supporting surface.

In wheel end assembly 10 in accordance with the present invention, one or more shims 80 of a predetermined thickness, can be inserted and/or removed between upper arm portion 54 of tube yoke 52 and upper arm extension member 64 to change the camber, as desired. For example, inserting one or more shims 80 having a greater thickness will decrease camber, while removing or inserting one or more shims 80 having a lesser thickness will increase camber. The shim or shims have openings corresponding to the openings 58 in the upper arm extension member 54.

Furthermore, in wheel end assembly 10 in accordance with the present invention, bolt 60 can be loosened and upper arm extension member 64 can be slid along an axis extending substantially perpendicular outwardly from the paper in the view of wheel end assembly 10 shown in FIG. 1 relative to upper arm portion 54 of tube yoke 52 to increase or decrease the caster. For example, moving upper arm extension member 64 outwardly from the paper in the motor vehicle wheel end assembly view shown in FIG. 1 toward the front of the motor vehicle in relation to upper arm 54 of tube yoke 52 will decrease the caster, while moving upper arm extension member 64 inwardly from the paper in the motor vehicle wheel end assembly view shown in FIG. 1 toward the rear of the motor vehicle in relation to upper arm portion 54 of tube yoke 52 will increase the caster. Once the relationship between upper arm extension member 64 and upper arm portion 54 of tube yoke 52 is such that the desired caster is established, bolt 60 is tightened in internally threaded opening 62 to secure upper arm extension member 64 and upper arm portion 54 of tube yoke 52 in this position to provide wheel end assembly 10 with the desired caster.

It should be noted that wheel end assembly 10 provides several advantages over known prior art motor vehicle wheel end assemblies. For example, wheel end assembly 10 provides for both camber and caster adjustment while, at the same time, eliminating the common problem of preloaded conventional ball joints 70 and 74 which are attributable, at least in part, to tube yoke 52 and steering knuckle 16 dimensional differences inherent in commonly utilized manufacturing processes. In prior art wheel end assemblies, the problem of preloaded conventional ball joints 70 and 74 which are attributable, at least in part, to tube yoke 52 and steering knuckle 16 dimensional difference inherent in commonly utilized manufacturing processes have been minimized by, for example, utilizing a more costly kingpin-type joint in the upper conventional ball joint connecting arrangement.

Although the present invention has been described above in detail, the same is by way of illustration and example only and is not to be taken as a limitation on the present invention. For example, although motor vehicle wheel end assembly 10 disclosed herein provides for camber and caster adjustment in the upper arm of tube yoke 52, such an adjustable arrangement could also be utilized in the lower arm of tube yoke 52 instead of, or in conjunction with, the adjustable upper arm of tube yoke 52 as disclosed herein. In addition, a variation of the preferred embodiment of the motor vehicle wheel end assembly disclosed herein could be utilized in conjunction with independent suspension designs utilizing an upper and/or lower control arm. In this case, the adjustment joint would be to the ball joint housing. However, the preferred embodiment of the motor vehicle ball joint disclosed herein would preferably not be utilized in designs where the ball joint supports vertical wheel loading. Accordingly, the scope and content of the present invention are to be defined only by the terms of the appended claims.

What is claimed is:

1. A wheel end assembly for a steering axle of a motor vehicle, said wheel end assembly comprising:

a tube yoke capable of being attached to an axle tube of the motor vehicle, said tube yoke having an upper arm portion having an opening formed therethrough and a lower arm, said lower arm having a bore formed therethrough;

an upper arm extension member having a first end and a second end, said first end including an internal opening and said second end including a bore therethrough;

a steering knuckle rotatably coupled to a wheel spindle of the motor vehicle, said steering knuckle having an upper mounting boss positioned adjacent said bore in said upper arm extension member and a lower mounting boss positioned adjacent said bore in said lower arm of said tube yoke, wherein said upper mounting boss and said lower mounting boss of said steering knuckle each include a bore extending therethrough;

at least one shim of predetermined thickness positioned between said upper arm portion of said tube yoke and said upper arm extension member to establish a desired camber of said wheel end assembly; and a removable fastener inserted through said opening extending through said upper arm portion of said tube yoke and into said internal opening in said first end of said upper arm extension member to establish the desired caster of said wheel end assembly.

2. The wheel end assembly in accordance with claim 1, wherein said opening in said upper arm portion of said tube yoke is primarily elongated alone an axis extending substantially perpendicular to said tube yoke.

3. The wheel end assembly in accordance with claim 1, wherein said removable fastener inserted through said opening extending through said upper arm portion of said tube yoke and into said internal opening in said first end of said upper arm extension member to establish the desired caster of said wheel end assembly is an externally threaded bolt and said internal opening in said first end of said upper arm extension member is an internally threaded opening having threads corresponding to said externally threaded bolt.

4. The wheel end assembly in accordance with claim 1, further including a first ball joint mounted in said bore in said upper mounting boss positioned adjacent said bore in said upper arm extension member and a second ball joint mounted in said bore in said lower mounting boss positioned adjacent said bore in said lower arm of said tube yoke.

5. The wheel end assembly in accordance with claim 4, wherein said opening in said upper arm portion of said tube yoke is primarily elongated along an axis extending substantially perpendicular to said tube yoke.

6. The wheel end assembly in accordance with claim 5, wherein said removable fastener inserted through said opening extending through said upper arm portion of said tube yoke and into said internal opening in said first end of said upper arm extension member to establish the desired caster of said wheel end assembly is an externally threaded bolt and said internal opening in said first end of said upper arm extension member is an internally threaded opening having threads corresponding to said externally threaded bolt.

7. The wheel end assembly in accordance with claim 4, wherein said removable fastener inserted through said opening extending through said upper arm portion of said tube yoke and into said internal opening in said first end of said upper arm extension member to establish the desired caster of said wheel end assembly is an externally threaded bolt and said internal opening in said first end of said upper arm extension member is an internally threaded opening having threads corresponding to said externally threaded bolt.

8. A wheel end assembly for a steering axle of a motor vehicle, said wheel end assembly comprising:

a tube yoke capable of being attached to an axle tube of the motor vehicle, said tube yoke having an upper arm portion having a first opening and a second opening formed therethrough and a lower arm, said lower arm having a bore formed therethrough;

an upper arm extension member having a first end and a second end, said first end including a first internal opening and a second internal opening and said second end including a bore therethrough;

a steering knuckle rotatably coupled to a wheel spindle of the motor vehicle, said steering knuckle having an upper mounting boss positioned adjacent said bore in said upper arm extension member and a lower mounting boss positioned adjacent said bore in said lower arm of said tube yoke, wherein said upper mounting boss and said lower mounting boss of said steering knuckle each include a bore extending therethrough;

at least one shim of predetermined thickness positioned between said upper arm portion of said tube yoke and said upper arm extension member to establish a desired camber of said wheel end assembly; and a first removable fastener inserted through said first opening extending through said upper arm portion of said tube yoke and into said first internal opening in said first end of said upper arm extension member and a second removable fastener inserted through said second opening extending through said upper arm portion of said tube yoke and into said second internal opening in said first end of said upper arm extension member to establish the desired caster of said wheel end assembly.

9. The wheel end assembly in accordance with claim 8, wherein said first opening in said upper arm portion of said tube yoke is primarily elongated in an axial direction extending substantially perpendicular to said tube yoke and said second opening in said upper arm portion of said tube yoke is primarily elongated in said axial direction extending substantially perpendicular to said tube yoke.

10. The wheel end assembly in accordance with claim 8, wherein:

said first removable fastener inserted through said first opening extending through said upper arm portion of said tube yoke and into said first internal opening in said first end of said upper arm extension member to establish the desired caster of said wheel end assembly is an externally threaded bolt and said first internal opening in said first end of said upper arm extension member is an internally threaded opening having threads corresponding to said externally threaded bolt; and said second removable fastener inserted through said second opening extending through said upper arm portion of said tube yoke and into said second internal opening in said first end of said upper arm extension member to establish the desired caster of said wheel end assembly is an externally threaded bolt and said second internal opening in said first end of said upper arm extension member is an internally threaded opening having threads corresponding to said externally threaded bolt.

11. The wheel end assembly in accordance with claim 8, wherein said at least one shim of predetermined thickness includes a first opening therethrough which corresponds to said first internal opening in said first end of said upper arm extension member and a second opening therethrough which corresponds to said second internal opening in said first end of said upper arm extension member.

12. The wheel end assembly in accordance with claim 8, further including a first ball joint mounted in said bore in said upper mounting boss positioned adjacent said bore in said upper arm extension member and a second ball joint mounted in said bore in said lower mounting boss positioned adjacent said bore in said lower arm of said tube yoke.

13. The wheel end assembly in accordance with claim 12, wherein said first opening in said upper arm portion of said tube yoke is primarily elongated in an axial direction extending substantially perpendicular to said tube yoke and said second opening in said upper arm portion of said tube yoke is primarily elongated in said axial direction extending substantially perpendicular to said tube yoke.

14. A method of camber and caster adjustment for a motor vehicle wheel end assembly having a tube yoke capable of being attached to an axle tube of the motor vehicle, said tube yoke having an upper arm portion having an opening formed therethrough and a lower arm, said lower arm having a bore formed therethrough, comprising the steps of:

providing at least one shim having a predetermined thickness between said upper arm portion of said tube yoke and an upper arm extension member having a first end and a second end;

connecting said upper arm portion of said tube yoke, said at least one shim and said upper arm extension member by inserting a fastener through said opening formed in said upper arm portion of said tube yoke, through an opening in said at least one shim and into an internal opening in said upper arm extension member to establish a desired camber of said wheel end assembly;

adjusting said upper arm extension member in relation to said upper arm portion of said tube yoke by moving said upper arm extension member with said fastener extending through said oversized opening in said upper arm extension member in relation to said upper arm portion of said tube yoke to establish the desired caster of said wheel end assembly; and tightening said fastener in said internal opening in said upper arm extension member to retain said upper arm extension member in desired relationship with said upper arm portion of said tube yoke.

15. The method of camber and caster adjustment for a motor vehicle wheel end assembly in accordance with claim 14, wherein the step of adjusting said upper arm extension member in relation to said upper arm portion of said tube yoke by moving said upper arm extension member with said fastener extending through said oversized opening in said upper arm extension member in relation to said upper arm portion of said tube yoke to establish the desired caster of said wheel end assembly consists of moving said upper arm extension member with said fastener extending through said opening in said upper arm extension member in an axis substantially perpendicular to said tube yoke.

16. The method of camber and caster adjustment for a motor vehicle wheel end assembly in accordance with claim 15, wherein said fastener has external threads, said internal opening has internal threads corresponding to said external threads of said fastener and the step of tightening said fastener in said internal opening in said upper arm extension member to retain said upper arm extension member in desired relationship with said upper arm portion of said tube yoke includes the step of threading said fastener having external threads into said internal opening having internal threads to retain said upper arm extension member in the desired relationship with said upper arm portion of said tube yoke.

17. The method of camber and caster adjustment for a motor vehicle wheel end assembly in accordance with claim 16, further including the step of mounting a first ball joint in a bore in an upper mounting boss positioned adjacent a bore in said upper arm extension member and mounting a second ball joint in a bore in said lower mounting boss positioned adjacent a bore in a lower arm of said tube yoke preceding the step of providing at least one shim having a predetermined thickness between said upper arm portion of said tube yoke and said upper arm extension member having said first end and said second end.

18. The method of camber and caster adjustment for a motor vehicle wheel end assembly in accordance with claim 14, wherein said fastener has external threads, said internal opening has internal threads corresponding to said external threads of said fastener and the step of tightening said fastener in said internal opening in said upper arm extension member to retain said upper arm extension member in desired relationship with said upper arm portion of said tube yoke includes the step of threading said fastener having external threads into said internal opening having internal threads to retain said upper arm extension member in desired relationship with said upper arm portion of said tube yoke.

19. The method of camber and caster adjustment for a motor vehicle wheel end assembly in accordance with claim 18, further including the step of mounting a first ball joint in a bore in an upper mounting boss positioned adjacent a bore in said upper arm extension member and mounting a second ball joint in a bore in said lower mounting boss positioned adjacent a bore in a lower arm of said tube yoke preceding the step of providing at least one shim having a predetermined thickness between said upper arm portion of said tube yoke and said upper arm extension member having said first end and said second end.

20. The method of camber and caster adjustment for a motor vehicle wheel end assembly in accordance with claim 14, further including the step of mounting a first ball joint in a bore in an upper mounting boss positioned adjacent a bore in said upper arm extension member and mounting a second ball joint in a bore in said lower mounting boss positioned adjacent a bore in a lower arm of said tube yoke preceding the step of providing at least one shim having a predetermined thickness between said upper arm portion of said tube yoke and said upper arm extension member having said first end and said second end.

* * * * *